F. W. ADSIT.
PHOTOMETER.
APPLICATION FILED MAY 13, 1916.

1,244,159.

Patented Oct. 23, 1917.
2 SHEETS—SHEET 1.

Witnesses:
Robert S. Weir
Arthur W. Carlson

Inventor
Frank W. Adsit
Foree Bain + Chany
his Atty's

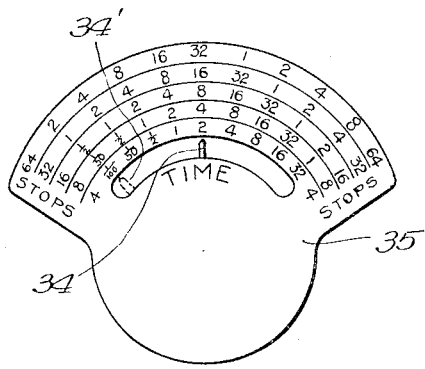
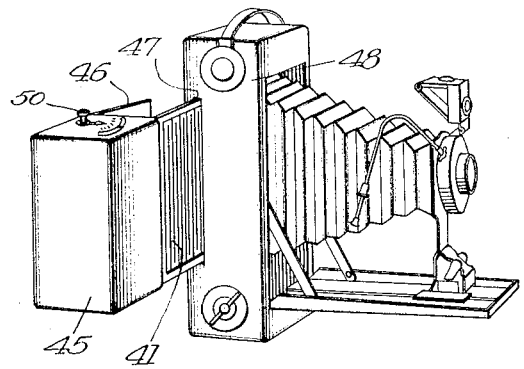
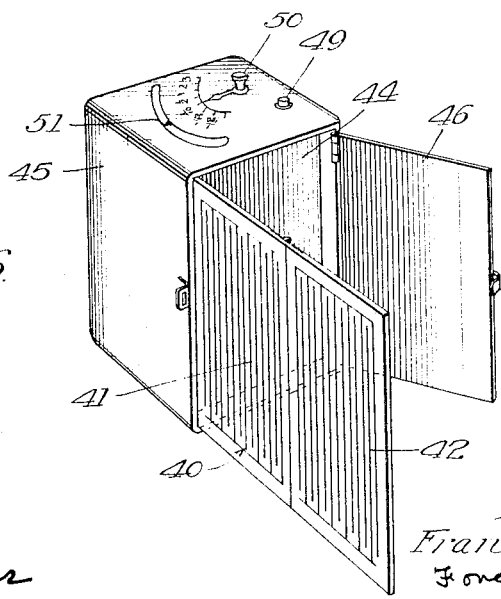

UNITED STATES PATENT OFFICE.

FRANK W. ADSIT, OF CHICAGO, ILLINOIS.

PHOTOMETER.

1,244,159.   Specification of Letters Patent.   Patented Oct. 23, 1917.

Application filed May 13, 1916. Serial No. 97,226.

*To all whom it may concern:*

Be it known that I, FRANK W. ADSIT, a citizen of the United States, residing at Chicago, in the county of Cook and State of Illinois, have invented certain new and useful Improvements in Photometers, of which the following is a specification.

My invention relates to improvements in apparatus for determining the proper size of aperture or stop and the proper length of exposure to be used in photography. More particularly the invention relates to a means for accurately determining the light value or sensitive-film-affecting qualities of light as actually projected upon the sensitive film from an object or scene to be photographed.

Photometers, actinometers, exposure meters and the like, depending for their operation upon color changes of light sensitive paper, the illumination cast through an aperture of variable dimensions, and the like, are well known in the art.

The principal object of my invention, however, is to provide a meter by means of which the photographic, or sensitive-film-affecting quality of the light projected upon the sensitive film from the object to be photographed is accurately measured and the diaphragm opening and shutter speed thus accurately determined.

Other and further objects of the invention will become apparent to those skilled in the art from a consideration of the following description and drawings, wherein:—

Fig. 5 is a perspective view of a camera showing a modified form of photometer adapted for insertion in an opening provided directly in front of the film or plate.

Fig. 6 is an enlarged perspective view of the photometer shown in Fig. 5, and;

Fig. 7 is an enlarged view of a scale such as may be applied to the apparatus shown in Figs. 3 and 4.

It is a well known fact that certain materials, such for example as selenium, are variable in their resistance to the passage of electrical currents in accordance with the intensity of the light to which they are exposed. In the carrying out of my invention I have utilized a light sensitive resistance cell of this character and so arranged it as to duplicate the conditions actually existing in a camera at the time of exposure, placing the light sensitive resistance cell in a position with respect to the lens so that the light thrown thereon will be exactly the same as that available for action upon the light sensitive photographic film.

Figure 1:
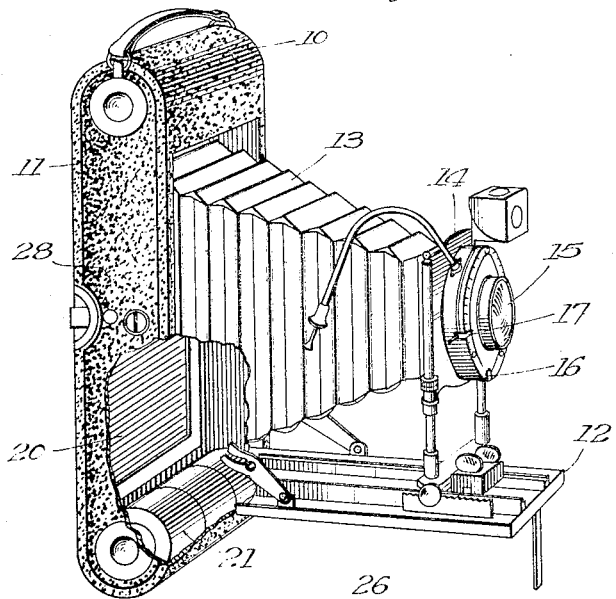
Figure 1 is a perspective view with parts broken away of a camera showing one embodiment of my invention.
Figure 2:
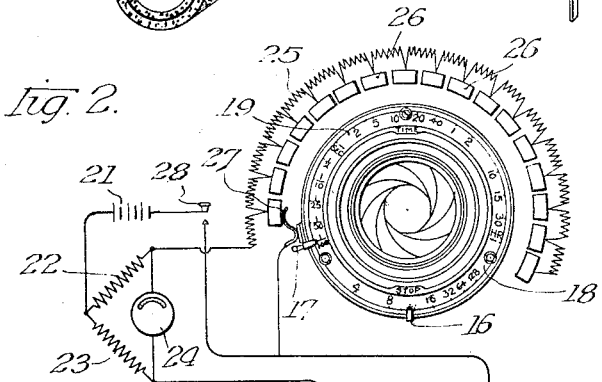
Fig. 2 is a diagrammatic illustration of a diaphragm and shutter mechanism, as well as the wiring connections, such as may be employed with the apparatus shown in Fig. 1.
Figures 3, 4:
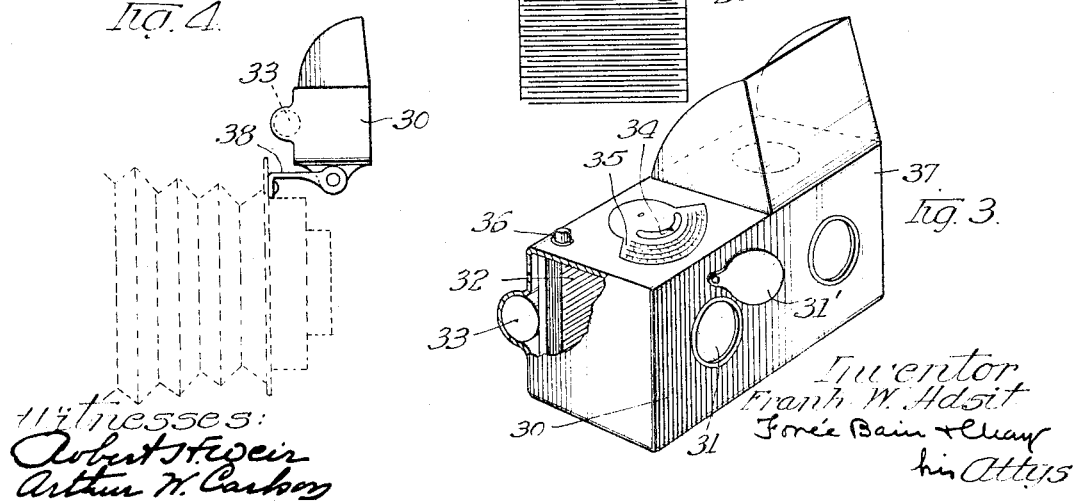
Fig. 3 is a perspective view with parts broken away of a simplified form of photometer embodying my invention in combination with a "view finder."
Fig. 4 is a side elevation of the apparatus shown in Fig. 3 illustrating its method of attachment to a folding camera.

In the three embodiments of my invention which I have illustrated for the purpose of clear disclosure the same principle is employed. In Figs. 1 and 2 the apparatus is in the form of a "dummy" camera in which the light sensitive resistance cell takes the place of the film or plate and the lens is a duplicate of that with which the photographer intends to make his exposure. In Figs. 3 and 4 a more compact and less expensive form is illustrated in which a lens, designed to duplicate in so far as possible the conditions existing within the camera to which it is attached, is employed in combination with the light sensitive resistance cell and its resistance measuring instrument, this being combined with the common type of "view finder," and both applicable to a part of a camera in the same manner as the "view finders" are usually mounted on folding or pocket types of cameras. In Figs. 5 and 6 still another modification is illustrated in which a light sensitive resistance cell is so arranged as to be readily inserted at the back of a camera either in place of the plate holder or film pack, or in a slot provided particularly for that purpose.

Referring more particularly to the embodiment illustrated in Figs. 1 and 2, the numeral 10 indicates the frame of a camera with its detachable back 11, hinged door 12, bellows 13 and lens board 14. In the lens board 14 is mounted a lens 15 with its diaphragm and shutter mechanism, the former being operated by the pointer lever 16 and the latter by the pointer lever 17. A suitable scale 18 is provided for coöperation with the pointer 16 to indicate the size of aperture and a scale 19 is provided for indicating in conjunction with the pointer 17 the speed of the shutter mechanism. Instead of the pointer 17 actuating the shutter speed mechanism, this may coöperate with the indicating scale merely to give a reading for shutter speed which can then be set by other means. At the rear of the camera carried by the back 11 is a light sensitive resistance cell 20, such as may be made by interlacing metal filaments upon a backing of insulating material and coating the same with selenium. In the place usually occupied by the film cartridge is positioned a small battery 21.

To measure the resistance of the selenium cell, (it being understood that though I may hereinafter designate this part of the apparatus as a selenium cell, I mean by that any form of cell in which the electrical resistance is variable in accordance with the light cast thereupon) I provide a well known resistance measuring apparatus termed the Wheatstone bridge, in which two legs 22 and 23 comprise resistance elements of known value, the selenium cell 20 being inserted in the third leg and a variable resistance in the fourth leg. A galvanometer 24 positioned between the pairs of legs indicates, when at zero, that the variable resistance equals the resistance of the selenium cell when the resistance in legs 22 and 23 are equal. The variable resistance which I will indicate by the numeral 25 in this embodiment is so arranged as to be readily inclosed within the casing surrounding the lens and is provided with a series of contacts 26 adapted for engagement with the sliding shoe 27 carried by the pointer 17. A suitable switch 28 is provided for closing the circuit when the operator desires to make a reading.

In the art of photography it is well known that the smaller the diaphragm aperture, the more clear cut and sharply defined is the picture. It is also true that the smaller the aperture in the camera the longer must be the exposure as a smaller amount of light is permitted to enter the box. Thus for example we will assume that the operator desires to ascertain the proper shutter speed and diaphragm opening for a snap-shot on a somewhat hazy day. Desiring to use as small an aperture as possible, he sets the lever 16 at stop No. 16, and on closing the switch 28 and sliding the lever 17 along its variable resistance finds that with this stop the galvanometer reads 0 when the shutter pointer 17 is at 1/6 second, and he knows, therefore, that it is necessary on that particular day to use a shutter speed of one-sixth a second if he uses a No. 16 stop. As it is practically impossible with a hand camera to take a snap shot using such a long exposure he is forced to open the diaphragm to stop No. 4 and on sliding the pointer 17 back to one twenty-fifth of a second he finds that the galvanometer comes to zero and that with one twenty-fifth of a second and a No. 4 diaphragm a fully timed exposure of the film may be made in that light of the object at which the instrument is pointed. Again, as another example we will suppose that the operator desires to photograph an automobile moving at say 15 miles an hour. His experience will tell him that to secure a clear cut picture of an object moving at this speed it is necessary to have a shutter speed of at least 1/100 of a second. He then sets his shutter for a speed of 1/100 of a second and on moving the diaphragm lever 16 he finds that on a particularly bright day he can secure that speed with a No. 8 stop, the galvanometer pointer standing at zero when the pointer 16 is opposite the No. 8 on the scale.

A somewhat different form is illustrated in Figs. 3 and 4, in which compactness of the apparatus has been given considerable importance as is necessary in designing attachments for hand or pocket cameras of the popular variety. In this instance I have provided a small casing 30 in the front of which is mounted a lens 31 and at the rear of which is mounted the selenium cell 32, and battery 33. A swinging cap 31' serves to cover the lens when not in use and protect the selenium cell from exposure to light. A galvanometer is incorporated within the top of the box, its pointer 34 showing through an aperture in the scale 35. A switch button 36 is provided for closing the circuit. Directly at the side of the casing 30 is mounted the usual form of "view finder" 37, the whole being carried upon a bracket 38 which may be readily attached in the place of the usual "view finder" bracket upon the lens board of a folding camera.

In this form of apparatus, instead of bringing the galvanometer to zero, and measuring the amount of resistance in the Wheatstone bridge, I have utilized resistances of known values and secure my reading by means of the galvanometer deflection. Thus for example on the scale 35 which is illustrated in an enlarged form in Fig. 7, the galvanometer needle 34 points to a scale which is plotted to provide a plurality of readings in seconds or fractions thereof, each arcuate segment having the corresponding stop number at its end. Thus for example with the reading indicated in Fig. 7, it will be obvious that a two second exposure is necessary with a stop No. 4 or a four second exposure is necessary with a stop No. 8. With the pointer deflected to the dotted line position indicated at 34' the operator may choose between using a high speed 1/100 of a second shutter and a large No. 4 stop or a smaller stop No. 8 and a 1/50 of a second shutter speed.

In the form of the apparatus illustrated in Figs. 5 and 6 I have endeavored to provide a compact portable box containing the entire apparatus and having the selenium cell 40 formed in two sections 41 and 42, hinged as at 43, so that it may be collapsed and folded within the space provided therefor at 44, in the end of the casing 45 and covered and protected from exposure to the light by means of the lid 46. When extended, as illustrated, the selenium cell 40 may be readily slipped through an aperture 47 provided for that purpose in the back of the camera box 48 directly in front of the film, or in the slot provided for the reception of a plate holder or film pack. In the latter form of apparatus the operator removes his film pack or plate holder and inserts the selenium cell, closes the switch contact button 49 and moves the pointer handle 50 until the galvanometer is brought to zero. The movement of the handle 50 varies a resistance somewhat similar to that shown in Fig. 2, balancing the variable resistance against the resistance of the selenium cell. On the galvanometer needle 51 coming to zero the pointer 50 will indicate upon a scale 52 the proper length of exposure for the particular conditions of diaphragm opening, the character of scene and light value.

Whereas I have illustrated and described but three embodiments of the invention for the purpose of giving a full and complete disclosure thereof, it will be obvious to those skilled in the art that various changes and modifications may be made therein without departing from the spirit of the invention or the scope of the appended claims.

Having described my invention, what I claim is:—

1. An apparatus for determining the sensitive-film-affecting light quality of a scene to be photographed, comprising a casing, a light-sensitive resistance cell positioned at the rear of the casing on the inner face thereof, a lens positioned in an aperture in the front wall of the casing for projecting light from the scene to be photographed upon the cell, movable means adapted to indicate resistance variations of said cell, and an exposure indicating scale for coöperation with said movable means.

2. In an apparatus of the character described the combination of a casing, a light-sensitive cell positioned therein, a lens mounted in an aperture at the front thereof, a diaphragm of variable opening associated with said lens, a movable means for indicating the resistance variations of said cell and an exposure indicating scale for coöperation with said movable means.

3. In an apparatus of the character described the combination of a casing, a light-sensitive resistance cell positioned therein, a lens mounted in an aperture at the front of the casing, a variable opening diaphragm associated with the lens, a Wheatstone bridge, a battery, a variable resistance, a circuit for said Wheatstone bridge, battery, resistance cell and variable resistance, and an indicator carried by the movable part of said variable resistance.

4. An apparatus for determining the sensitive-film-affecting light quality of a scene to be photographed, comprising a casing, a light sensitive resistance cell therein, an aperture in the front of the casing, a variable opening diaphragm associated with the aperture, a Wheatstone bridge, a battery, a variable resistance, a circuit for said Wheatstone bridge, battery, resistance cell and variable resistance, and an indicator carried by the movable part of said resistance.

5. An apparatus for determining the sensitive-film-affecting light quality of a scene to be photographed, comprising a casing, a light sensitive resistance cell therein, an aperture in the front of the casing, a movable means for indicating the variations in resistance of said cell, and a combined diaphragm opening and exposure indicating scale for coöperation with said movable means.

In testimony whereof I hereunto set my hand in the presence of two subscribing witnesses.

FRANK W. ADSIT.

In presence of—
STANLEY W. COOK,
MARY F. ALLEN.